Patented Jan. 2, 1945

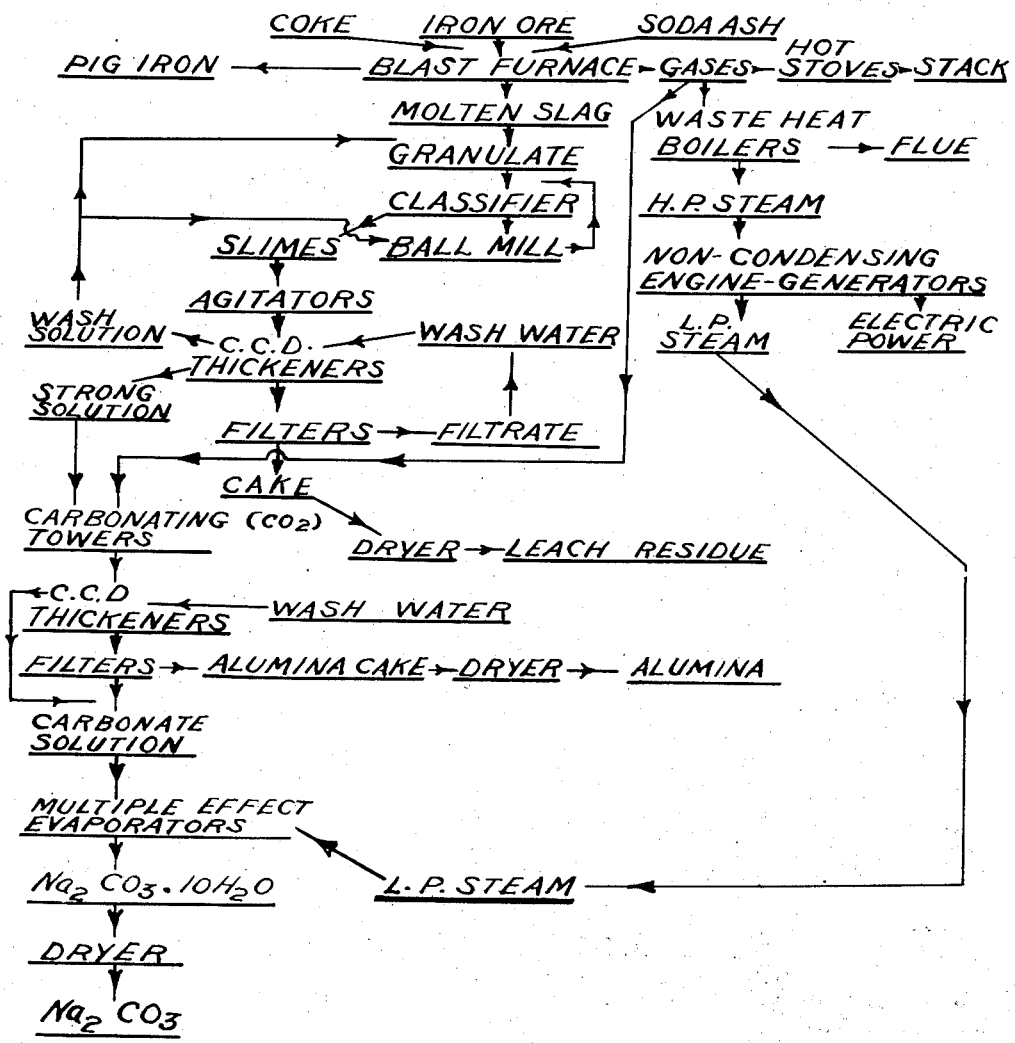

2,366,177

UNITED STATES PATENT OFFICE 2,366,177

TREATMENT OF TITANIFEROUS ORES

Thomas P. Campbell, Denver, Colo.

Application November 15, 1941, Serial No. 419,295

8 Claims. (Cl. 75—31)

This invention relates to the treatment of titaniferous iron ores, and more particularly relates to a treatment for the separation of the principal constituents of such ores.

Ores of this character are found in many parts of the United States and Canada, as well as in certain European deposits and elsewhere. The ores of Iron Mountain, Wyoming, for example, are titaniferous magnetites. In other ores, chromium, manganese and/or vanadium may be present. The present process has been developed to treat a variety of ores of this character.

At prevailing market prices, these ores can be worked profitably only if the titania and iron of the ore are separated and sold as marketable products. Due to the complex and intimate mixture of these substances in the ores, it is not feasible to unlock and separate them by physical means only, and so far as now known it is impractical to separate these constituents by any means other than smelting.

While it is known that smelting methods can be applied to the treatment of such ores, if the desideratum is merely the recovery of the iron content, these known smelting methods have the deleterious result of so commingling the titania with gangue and other constituents in the resulting slag that the titania can only be removed from such slag by complex and costly operations.

It is an object of the present invention to provide a smelting treatment for titaniferous ores in which titania, and to a lesser degree, alumina, magnesia and other valuable by-products may be readily recovered from the resulting slag after the iron content has been removed initially in such treatment.

Another object of the present invention is to provide economical methods for regenerating and recovering a substantial portion of the fluxing agent of the primary treatment.

A further object of the invention is to provide a simple, economical and efficient process for the production of a plurality of marketable products derived from titaniferous iron ores.

Other objects reside in novel steps and treatments, all of which will appear more fully in the course of the following description.

The present invention utilizes the discovery that soda ash (normal sodium carbonate) satisfies the requirements as a fluxing agent for these ores. The soda reacts with titania to form one or more sodium titanates, which promptly hydrolyze in aqueous solution precipitating titania or titanic acid when the slag is ground with water.

Sodium bicarbonate or corresponding salts of other alkali metals such as lithium and potassium, which form water soluble compounds, react similarly as fluxing agents, but for economic reasons the soda ash is best adapted to the general requirements of this process.

The most probable reaction between the soda and titania may be indicated by the equation:

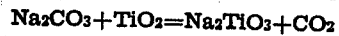

$$Na_2CO_3 + TiO_2 = Na_2TiO_3 + CO_2$$

Similar reactions probably occur between lime, CaO, and titania and between magnesia, MgO, and titania. When silica is present, however, these latter titanates are probably modified or altered into titano-silicates of lime and magnesia. When oxidized compounds of Cr, V, Mn and the like are present in the ore, they react in the general sense of the above equation with soda ash to form the corresponding chromates, vanadates, manganates, etc.

That the foregoing compounds, or others closely analogous to them, exist in the molten and solid slag in molecular dispersion is evident from the appearance and chemical behavior of such slags. Such appearance and behavior were tested extensively in a series of experiments with synthetic slags of this type. However, the precise constitution of these slags is of minor importance as compared to their behavior on leaching, looking to the economical recovery of their valuable constituents.

Thus, all the titania is found in a water leach residue of the slag, along with all the lime, magnesia and silica which were present in the ore. Alumina forms a sodium aluminate which dissolves in water and remains in solution but may be precipitated by carbonation. Advantage is taken of this condition in the regenerative treatment of the soda ash as will be explained hereinafter.

To afford a better understanding of the practice of the present invention, reference is made to the accompanying flow sheet illustrating a typical treatment which has been found to satisfy all the objects of the present invention.

In this operation, the iron ore is suitably crushed and then mixed with coke or other carboniferous material and soda ash as the charge of a blast furnace.

In the mixing operation, the quantity of soda ash used is determined by the analysis of the gangue constituents of the ore on charge, on the assumption that certain compounds, as outlined above, are formed in the resulting slag. Regardless of the validity of this assumption, it has been found that, as a matter of experimental fact, slags thus formed are fluid and homogeneous at smelting temperatures.

As a purely empirical rule, therefore, the quantity of soda required for a given charge may be determined from the following table:

| Gangue constituent unit weight | Weight soda required |
|---|---|
| $TiO_2$ | 1.33 |
| $Al_2O_3$ | 1.04 |
| $Cr_2O_3$ | 0.70 |
| $Mn_2O_3$ | 0.67 |
| $V_2O_3$ | 0.58 |

Similarly, each unit of CaO is assumed to combine with 1.43 units of $TiO_2$ and 1.07 units of $SiO_2$; and each unit of MgO is assumed to combine with 1.98 units of $TiO_2$ and 1.49 units of $SiO_2$. The use of a small excess of soda, over and above these requirements, is permissible; in fact, the use of excess soda tends to make the slag more fluid at smelting temperatures. But it has been observed that such excess soda is decomposed at these high temperatures in accordance with the following reaction:

$$Na_2CO_3 + C = Na_2O + 2CO$$

and that this excess $Na_2O$ then tends to impede or reverse the dissolution of the sodium titanate during the subsequent leaching process, as discussed below. The use of less soda than that called for by the above proportions leads to the formation of viscous slags and to the presence of considerable quantities of reduced titanium in the iron product.

Thus, for the usual titaniferous magnetite, containing about 21% $TiO_2$, the quantity of soda on charge would be somewhat less than half the weight of ore used; while for a high-grade ilmenite ore, containing, say, 55% $TiO_2$, the quantity of soda required would be about three-fourths the weight of ore used.

For convenience in definition throughout the specification, this method of computing the quantity of fluxing agent used in a given charge will be referred to as "a predetermined proportion of the gangue constituents."

The amount of carbon required varies according to smelting methods employed, but cannot be less than that theoretically required to reduce all the iron on charge. The temperature employed should not be less than 1450° C. and for best results should be just above 1500° C.

As indicated in the flow sheet, the hot gases passing from the furnace are collected and utilized in subsequent portions of the operation in order to hold operating costs at a minimum. It will be understood that when preferred, this heating and reduction may be carried out by electrothermic means or other suitable apparatus. However, blast furnace operation has been selected for the present illustration because of its economic advantage.

Following the heating of the charge as above specified, the molten and reduced charge is tapped or removed from the furnace. The pig iron passes from the treatment at this stage and is a product very low in silicon, sulphur and phosphorus, which is comparable in grade to "charcoal iron" or "Swedish nail iron." If desired, this pig iron may be further treated by methods well known in the art.

The molten slag is next taken as a product for treatment and subjected to granulation and grinding followed by a leaching operation. The granulation eliminates the necessity for coarse crushing and intermediate grinding of the solid slag, an operation which is not only costly but difficult to accomplish as these solids are strongly hygroscopic and tend to choke and bind in dry grinding apparatus.

In the circuit illustrated in the flow sheet, the product of the granulating treatment is passed to a classifier and there mixed with relatively large quantities of liquid. The raked product of the classifier is then passed to a ball mill operating in closed circuit therewith, with sufficient wash solution recirculated from the subsequent leaching operation to establish the proper pulp consistency in the grinding operation. Preferably 60 to 70 parts solids to 40 to 30 parts liquid are utilized as the grinding mill charge.

The slimes passing from the classifier are first subjected to agitation, with additional wash solution to form a pulp containing, say, 4 parts solution to 1 part solids by weight. This mixture is then passed to a countercurrent decantation treatment, a washing type tray thickener being well suited to perform the latter operation.

In the countercurrent decantation operation, a strong solution is removed at one point of discharge and a weaker wash solution at another. The wash solution so removed is returned through suitable conduits for mixture with the molten slag passing into the granulation treatment and also as the dilution agent fed to the ball mill in the closed circuit grinding operation.

The thickened product of countercurrent decantation is passed to a battery of filters with the filtrate removed thereby returning as the wash water of countercurrent decantation. The cake produced by the filtering treatment contains, inter alia, lime, magnesia, silica and titania. Depending upon market conditions, it may be regarded as a final product and marketed as such or further treated for the separation of its constituents.

In the former case, the cake preferably is passed to a drier for removal of adhering moisture and the dried product is passed from the treatment as a final product.

The strong solution separated in the countercurrent decantation operation is passed to a carbonating treatment, which constitutes the soda ash regenerating operation of the treatment.

Carbonating towers or other suitable apparatus are provided and $CO_2$ gas is passed through the solution precipitating $Al(OH)_3$, and other like compounds, with coincidental regeneration of the soda ash.

Preferably, the $CO_2$ is obtained from the blast furnace gases and, consequently, what otherwise would be a waste product of the primary separation is utilized at this secondary stage of the operation.

After passing through the carbonating towers, the treated solution is introduced into another countercurrent decantation operation, with wash water added to thoroughly remove adhering solution from the solid content.

The thickened product of countercurrent decantation passes to one or more filters with the cake removed therefrom, passed into a drier and discharged thereby as hydrated or calcined alumina constituting another market product.

The carbonate solution separated in the filtering action is passed to multiple effect evaporators where steam generated by the blast furnace gases may be utilized as the heating medium. The product of the evaporating treatment is $$Na_2CO_3.10H_2O$$

which is introduced into a drier and discharged therefrom as $Na_2CO_3$.

While the amount of soda ash thus recovered may approximate only half of that in the original charge, the recovery is attained in conjunction with the production of the hydrated or calcined alumina, which is a marketable product, and consequently the cost of the regeneration to the operation is only nominal.

The use of soda ash in the process has the advantageous result of forming water soluble aluminates and titanates, which in the subsequent leaching operation produce equilibria limiting the quantity of such constituents recoverable by leaching.

However, due to the water soluble properties, the constituents are readily amenable to the carbonating treatment, with the result that much of the soda ash is effectively regenerated for reuse in the treatment, while one or more valuable secondary products are obtained in the operation.

Similarly, the utilization of some of the solution from the countercurrent decantation treatment following the granulation operation serves to increase the concentration of constituents in the leach residue, with the result that the final product of this operation has a higher percentage of valuable constituents than naturally occurring products of similar composition.

Having thus described a typical practice of the present invention with particular reference to its distinctive features, a typical test operation will now be described to further illustrate the latitude in operating control which the present invention provides.

In this operation, the ore taken for treatment was a titaniferous magnetite ore from Iron Mountain, Wyoming, which had the following composition:

| | Per cent | | Per cent |
|---|---|---|---|
| Fe | 49.5 | $Al_2O_3$ | 4.92 |
| $TiO_2$ | 21.1 | $SiO_2$ | 1.1 |
| MgO | 1.9 | S | 0.03 |
| CaO | 0.32 | P | 0.1 |

2 kilograms of this ore were mixed with 600 grams of petroleum coke and ground through 28 mesh. The resulting mixture was then mixed with 800 grams of soda ash and placed in a graphite crucible in a coke-fired pot furnace. The temperature was raised to 1500° in two hours' time, when the entire charge had reached a molten state. The charge was then held at this temperature for another half hour, after which it was tapped into an iron mold. The resulting solids consisted of 1030 grams of hard, white iron containing about 4% impurities (mostly carbon) and 1110 grams of slag containing the following:

| | Per cent | | Per cent |
|---|---|---|---|
| FeO | 5.7 | $Al_2O_3$ | 8.9 |
| $TiO_2$ | 37.2 | SiO | 2.0 |
| MgO | 3.4 | $Na_2O$ | 42.2 |
| CaO | 0.6 | | |

The amount of soda ash used on the charge was calculated on the assumption that certain compounds are formed in the slag. The compounds assumed were $Na_2TiO_3$, $CaTiO_3$, $MgTiO_3$, $MgO.TiO_2.SiO_2$, and $Na_2Al_2O_4$.

The slag produced in the smelting action was ground in water to pass a 65 mesh screen and the pulp was then agitated with additional water to make a pulp ratio of approximately 4 parts liquid to 1 part solid. This agitation continued for a period of two hours, after which the pulp was settled and the solids filtered and washed. The solids showed a dry weight of 886 grams and analyzed as follows:

| | Per cent | | Per cent |
|---|---|---|---|
| FeO | 7.3 | $Al_2O_3$ | 3.0 |
| $TiO_2$ | 46.5 | $SiO_2$ | 2.5 |
| MgO | 4.3 | $Na_2O$ | 35.7 |
| CaO | 0.7 | | |

It will be noted that this water leach serves to dissolve most of the aluminate and part of the $Na_2O$. Repeated tests show that the incomplete dissolution of the $Na_2TiO_3$ is due to the fact that this compound hydrolyzes promptly from solution, yielding soluble soda caustic and insoluble $Ti(OH)_4$.

Apparently, for any given slag, this hydrolysis leads to a condition of dynamic equilibrium in the sense of the following reaction:

$$Na_2TiO_3 + 3H_2O \rightleftarrows Ti(OH)_4 + 2NaOH$$

Apparently the titanate acts as a buffer to establish and maintain a given alkalinity in the solution, and since the titanate is the salt of a very strong base and a weak acid, the reaction cannot proceed very far to the right and, consequently, is limited as indicated in the above formula.

In connection with the foregoing operations, it will be observed that the slag contains a substantial quantity of FeO. This condition, indicating incomplete reduction, is due to the small scale batch methods employed; electrothermic or blast furnace smelting on a commercial scale lead to more complete reduction of the iron.

The foregoing tests have been repeated in numerous instances without giving any significant variation in result. Consequently, it may be assumed that commercial operations would produce results consistent with those herein set forth, and the final selection of method to be employed for the secondary separation, if any, will be dependent largely on the factors of treatment costs and price differentials of the products.

From the foregoing, it is apparent that the operating procedure herein set forth satisfies the requirements that a given treatment of ores of this character include simplicity of operation, economy of operation, and efficiency in separation.

The treatment hereinbefore described is related to the subject matter of my co-pending application, Serial Number 469,559, filed December 19, 1942, for Titaniferous magnetite treatment, and features described but not claimed herein have been made the subject of claims in said application.

Changes and modifications may be availed of within the spirit and scope of the invention as defined in the hereunto appended claims.

What I claim and desire to secure by Letters Patent is:

1. The process of treating titaniferous iron ores or the like, which comprises mixing such an ore with carboniferous matter and soda ash, heating the resulting mixture to a degree sufficient to render the entire mass molten, separating the iron content from the slag of said molten mass, introducing the molten slag into a cool liquid in a granulating action, subjecting the resulting product to a water leaching treatment, and separating the solids from the liquid following the leaching operation.

2. The process of treating titaniferous iron ores or the like, which comprises mixing such an ore with carboniferous matter and soda ash, heating the resulting mixture to a degree sufficient to render the entire mass molten, separating the iron content from the slag of said molten mass, granulating the slag following said separation, subjecting the granulated product to agitation and countercurrent decantation, separating the liquid and solid products of countercurrent decantation, subjecting the liquid so separated to carbonation, and removing the precipitated solids of the carbonation treatment.

3. The process of treating titaniferous iron ores or the like, which comprises mixing such an ore with carboniferous matter and soda ash, heating the resulting mixture to a degree sufficient to render the entire mass molten, separating the iron content from the slag of said molten mass, granulating the slag following said separation, subjecting the granulated product to agitation and countercurrent decantation, separating the liquid and solid products of countercurrent decantation, subjecting the liquid so separated to carbonation, removing the precipitated solids of the carbonation treatment, and subjecting the separated solution to evaporation and drying for the recovery of soda ash.

4. In a process of treating titaniferous iron ores or the like by smelting, the improvement which comprises introduction of a salt of an alkali metal, capable of forming water-soluble compounds with titania-containing gangues, as the fluxing agent of the smelting operation, subjecting the slag of the smelting treatment to leaching, passing the liquid of the leaching operation through a carbonation zone, and recovering alkali carbonate of the carbonation treatment as a final product of the operation.

5. In a process of treating titaniferous iron ores or the like by smelting, the improvement which comprises introduction of soda ash as the fluxing agent of the smelting operation, subjecting the slag of the smelting treatment to leaching, passing the liquid of the leaching operation through a carbonation zone, and recovering sodium carbonate of the carbonation treatment as a final product of the operation.

6. The process of treating titaniferous iron ores or the like, which comprises mixing such an ore with carboniferous matter and a salt of an alkali metal, heating the resulting mixture to a degree sufficient to render the entire mass molten, separating the iron content from the slag of said molten mass, granulating the slag following said separation, subjecting the granulated product to agitation and countercurrent decantation, separating the liquid and solid products of counter-current decantation, and discharging the separated solids from the treatment.

7. The process of treating titaniferous iron ores or the like, which comprises mixing such an ore with carboniferous matter and a salt of an alkali metal, heating the resulting mixture to a degree sufficient to render the entire mass molten, separating the iron content from the slag of said molten mass, granulating the slag following said separation, subjecting the granulated product to agitation and countercurrent decantation, separating the liquid and solid products of countercurrent decantation, discharging the separated solids from the treatment, subjecting the liquid so separated to carbonation, and removing the precipitated solids of the carbonation treatment.

8. The process of treating titaniferous iron ores or the like, which comprises mixing such an ore with carboniferous matter and a salt of an alkali metal, heating the resulting mixture to a degree sufficient to render the entire mass molten, separating the iron content from the slag of said molten mass, granulating the slag following said separation, subjecting the granulated product to agitation and countercurrent decantation, separating the liquid and solid products of countercurrent decantation, discharging the separated solids from the treatment, subjecting the liquid so separated to carbonation, removing the precipitated solids of the carbonation treatment, and regenerating the soda ash content of the remaining solution.

THOMAS P. CAMPBELL.